United States Patent [19]

Saur

[11] Patent Number: 4,473,148
[45] Date of Patent: Sep. 25, 1984

[54] MOTION SENSOR FOR MOTION SENSING ACCUMULATOR
[75] Inventor: Charles W. Saur, Sparta, Mich.
[73] Assignee: Lear Siegler, Inc., Grand Rapids, Mich.
[21] Appl. No.: 419,149
[22] Filed: Sep. 17, 1982
[51] Int. Cl.³ .............................................. B65G 13/06
[52] U.S. Cl. ..................................... 198/781; 198/790
[58] Field of Search ......................... 198/781, 790, 789

[56] References Cited

U.S. PATENT DOCUMENTS

| | | | |
|---|---|---|---|
| 3,854,576 | 12/1974 | Bowman | 198/781 |
| 4,091,916 | 5/1978 | Warner | 198/790 |
| 4,273,239 | 6/1981 | Thwaites et al. | 198/790 X |
| 4,353,458 | 10/1982 | Saur | 198/781 |
| 4,361,224 | 11/1982 | Bowman | 198/781 |
| 4,361,225 | 11/1982 | Saur | 198/781 |

Primary Examiner—Joseph E. Valenza
Assistant Examiner—Stuart Millman
Attorney, Agent, or Firm—Price, Heneveld

[57] ABSTRACT

An accumulator conveyor is equipped with sensors which respond to article movement by pivoting about a vertical axis as the result of having a pair of laterally spaced wheels on opposite ends of a shaft with one wheel driven by the propelling member and the other by an article supporting roller. The first wheel is larger than the second wheel and is attached to the shaft while the second wheel is connected to the shaft by a one-way clutch. Pivotal movement of the sensor results from differentiation between the relative speeds of the wheels.

11 Claims, 10 Drawing Figures

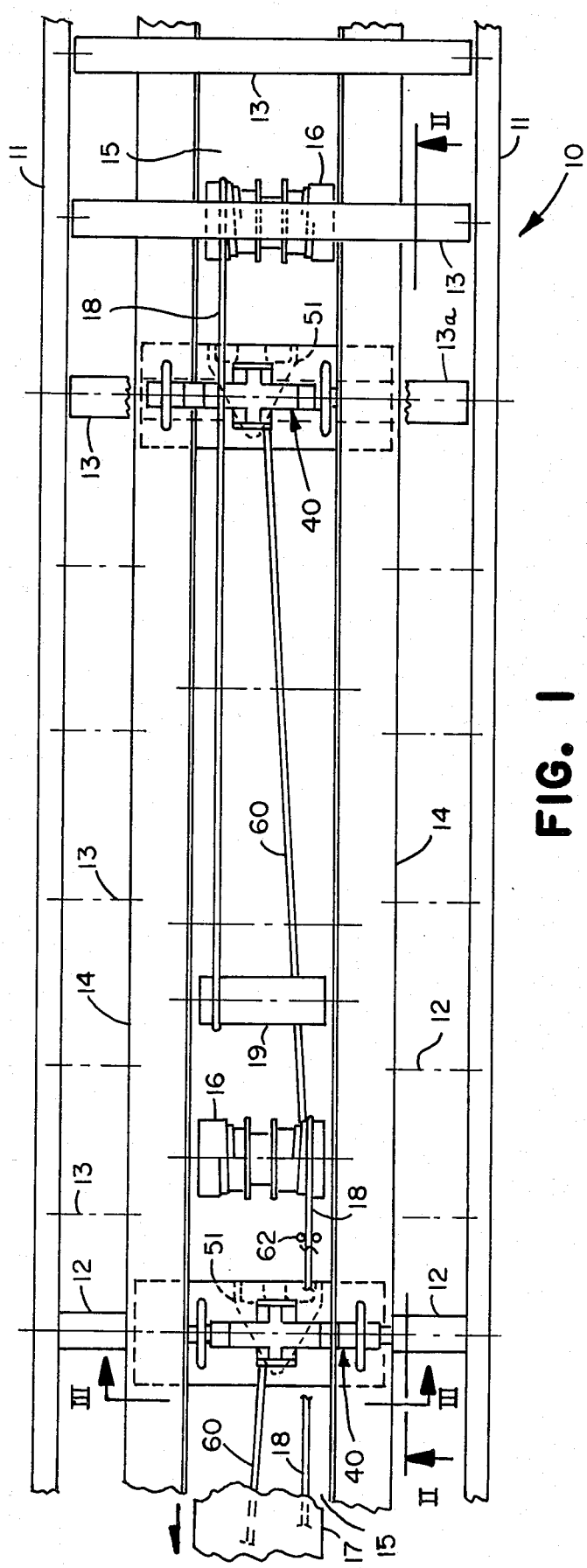
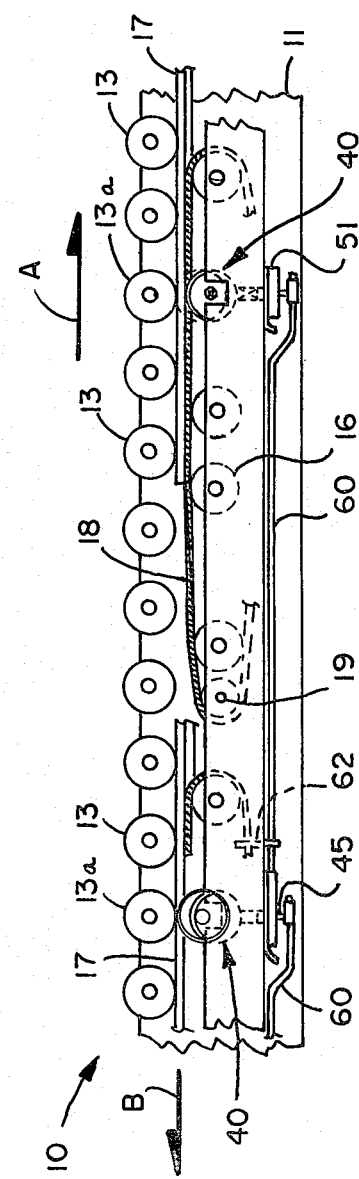
FIG. 1
FIG. 2

MOTION SENSOR FOR MOTION SENSING ACCUMULATOR

FIELD OF THE INVENTION

This invention relates to conveyors and more particularly to the sensing mechanism for controlling the mode change of an accumulator conveyor.

BACKGROUND OF THE INVENTION

For many years the conveyor industry has been developing and manufacturing accumulator conveyors. In this type of conveyor the presence of articles on the conveyor is sensed and, if the article is moving normally, the conveyor continues to move the article forwardly. If, however, the forward movement of the article is impeded or halted, this fact is sensed and the propelling force applied to that article or to the next following article is released automatically. When the impediment to the forward motion of the lead article is removed, the conveyor is automatically returned to transport mode and forward motion of the articles is resumed. In many accumulators the forward motion of stationary articles on the same accumulator is sequentially reinstated zone by zone or article by article. In other accumulator designs the forward motion of the articles can be initiated substantially simultaneously such that the discharge from the accumulator is basically that of a slugged line. A number of devices have been developed for sensing the presence and state of movement of the articles along the conveyor. These include article contacting sensors such as raised rollers or wheels, air jets which are interferred with by the continuing presence of an article above the electric eyes and similar electric sensing means. All of these sensing devices respond to the presence of the article with the response being either immediate or in many cases delayed by any of several types of dampening means. The sensing units heretofore used have the drawback either of being very limited in the range of article weights capable of producing a response or being sensitive to environmental conditions such as moisture, dust and the like. The present invention is designed to provide a new, different and improved sensing means for controlling and automatically switching between transport and accumulation modes.

BRIEF DESCRIPTION OF THE INVENTION

Whereas conventional sensing means for accumulators respond to article presence, this invention provides sensing means responsive to motion. While some accumulator sensors incorporate signal or response delay capability so that the presence of an article in normal motion does not generate a mode change signal, the response is to article presence rather than article motion. This invention provides a sensor responsive to article motion by detecting the rate of rotation of the article supporting rollers.

The invention provides a motion sensor consisting of a pair of spaced wheels interconnected by a one-way clutch. One wheel is in constant contact with and driven by the propelling member and the other wheel is in contact with and driven by one of the article supporting and transporting rollers. The roller contacting wheel is free to rotate in response to rotation of the roller but if the transport roller is held stationary by a stalled article or its angular velocity materially reduced due to slowing of the forward motion of the article, the wheel's rotation is similarly changed. Either situation will cause the sensor to shift the accumulator in the zone controlled by the sensor from transport to accumulation mode. At the same time, as soon as the article is once more free to move, the sensor will respond to the roller's motion and restore the accumulator to transport mode. The reaction of the sensor of this invention can be translated into mode shift control in any of several ways.

BRIEF DESCRIPTION OF THE DRAWINGS

FIG. 1 is a fragmentary, plan view of an accumulator conveyor equipped with this invention, the article transport rollers being deleted for clarity;

FIG. 2 is a fragmentary, sectional elevation view taken along the plane II—II of FIG. 1;

DESCRIPTION OF THE PREFERRED EMBODIMENT

Figure 3:
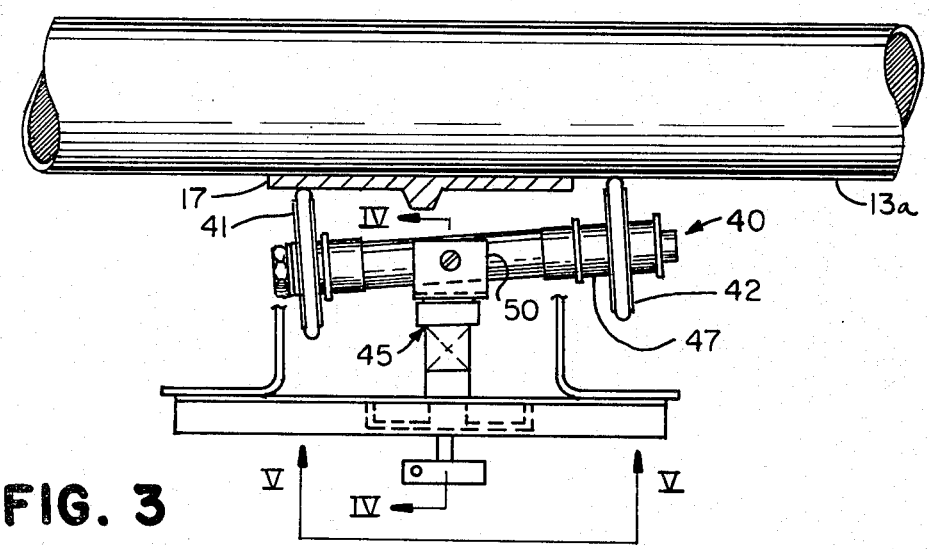
FIG. 3 is an enlarged fragmentary, sectional elevation view taken along the plane III—III of FIG. 1.

In the following description the terms "upstream" and "downstream" refer to the direction of movement of articles being transported. The direction of article movement is indicated in FIG. 2 by the arrow A and the direction of belt travel by the arrow B.

Referring to the drawings and, more particularly, to FIG. 1, the numeral 10 identifies an accumulator having a pair of side frame members 11 interconnected by cross members 12. Forming the top surface of the accumulator and rotatably mounted at uniformly spaced intervals lengthwise thereof are carrier or transport rollers 13. These are supported by the side frame members 11. Beneath the rollers and supported on the cross members 12 are a pair of rails 14 defining a medial lane 15. Rotatably mounted between the rails 14 at uniformly spaced intervals are support rollers 16. The support rollers 16 support the propelling member 17. The support rollers 16 are arranged in groups with all the rollers forming a group being interconnected by an auxiliary or secondary driving member or belt 18. At its upstream end the belt 18 is trained over a terminal roller 19 which is of uniform diameter and smaller than the support rollers 16. The number of support rollers assigned to a group is determined by the average length of the articles to be moved on the conveyor. Each group of support rollers connected by a common secondary belt 18 constitutes a zone with the zones being arranged in tandem along the length of the conveyor.

Figure 7:
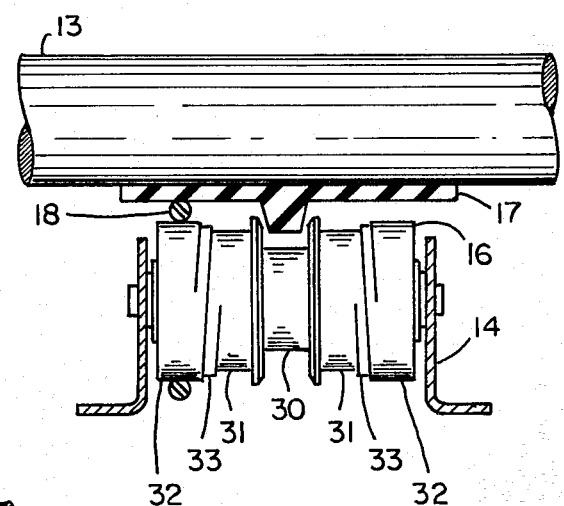
FIGS. 7 and 7A are elevation views of a support roller with the auxiliary belt in transport position in FIG. 7 and accumulation position in FIG. 7A.
Figure 7A:
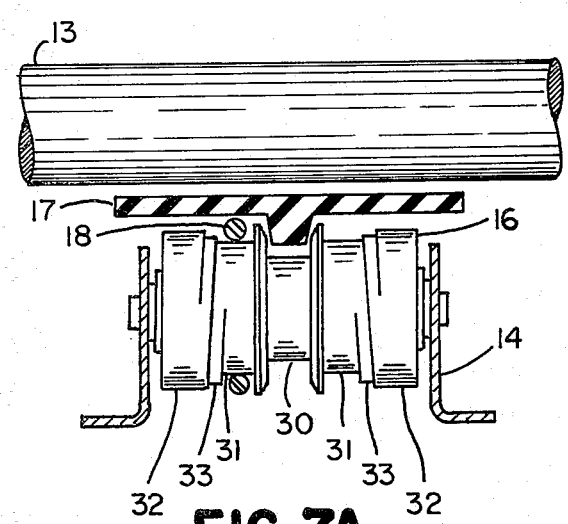

Each of the support rollers 16 is symmetrical about its midpoint having a central channel 30 to receive the guide rib of the primary propelling member 17 (FIGS. 7 and 7A). On each side of the channel 30 is an inner portion 31 separated from the channel 30 by a flange 36. Outwardly of the inner portions 31 are the outer portions 32. The outer portions 32 are of greater diameter than the inner portions 31 with the two portions being connected by a ramp 33. The inner and outer portions provide the supports for the auxiliary belt 18 with the ramps 33 providing the guide to facilitate lateral movement of the belt from one portion to another. As will be observed from FIG. 7, when the auxiliary belt is on the outer portion 32, it is positioned between the propelling member and the support rollers whereby it is positively driven by the propelling member 17. When it is shifted to the inner portions it continues to be positively driven but permits the propelling member 17 to drop and disengage from the carrier rollers 13. Thus, by shifting the auxiliary drive belt between the inner and outer portions, the conveyor in the affected zone is shifted between transport and accumulation modes. This structure for affecting mode shift is disclosed in my co-pending application, Ser. No. 188,314, now U.S. Pat. No. 4,361,225, entitled "Actuator Belt Accumulator", filed Sept. 18, 1980, and assigned to the same assignee.

The position of the auxiliary belt 18 is controlled by a sensor assembly 40. A separate sensor assembly is provided for each zone with the sensor for one zone being located adjacent the discharge end of the next downstream zone. Thus, the sensors do not control the mode of the zone in which they are located.

Figure 4:
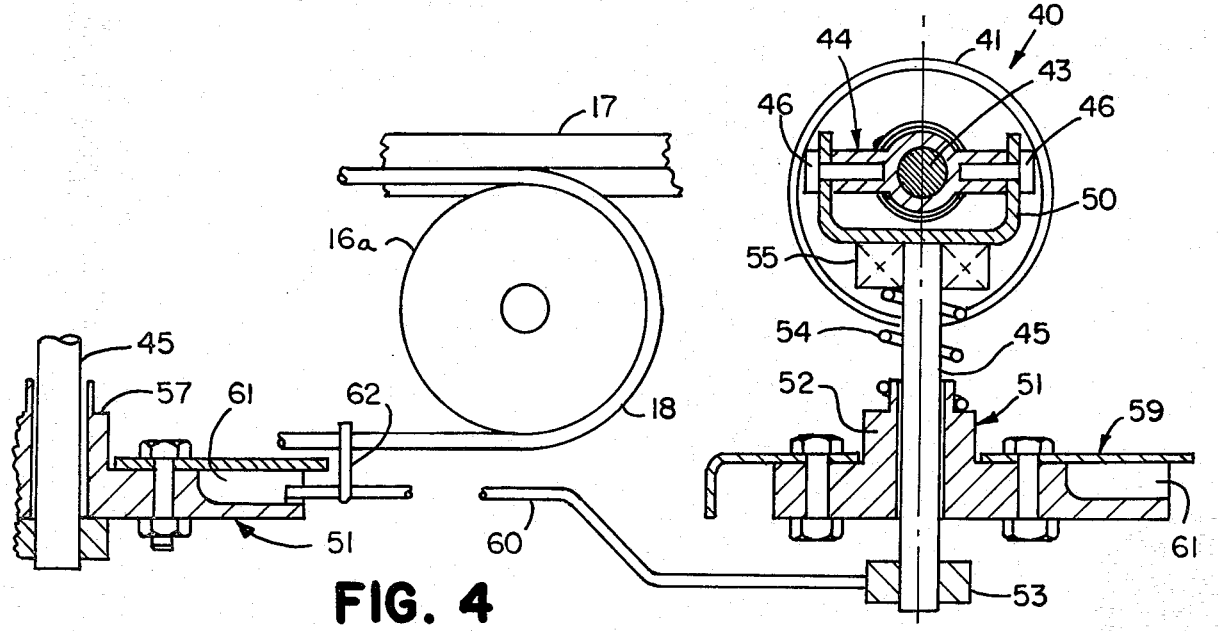
FIG. 4 is an enlarged, broken sectional, elevation view taken along the plane IV—IV of FIG. 3.
Figure 5:
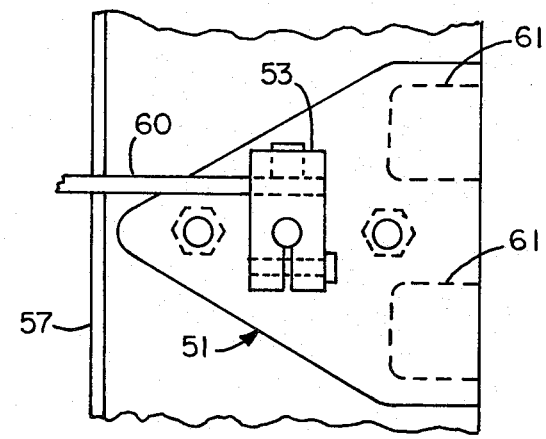
FIG. 5 is a fragmentary bottom view taken along the plane V—V of FIG. 3.

Each sensor has a pair of wheels 41 and 42 mounted on a common axle 43 (FIGS. 3 and 4). The axle is mounted in an elongated housing 44 which is pivotally supported intermediate its ends, preferably at midpoint between the ends, by a post 45. The pins 46 provide the pivotal attachment of the housing 44 to the yoke 50 at the top of the post. The wheel 41 is mounted on one end of the shaft 43 and so attached that the shaft is forced to rotate by the wheel. The wheel 42 is connected to the shaft 43 by a one-way clutch 47. The wheel 41 contacts the primary propelling member 17 while the wheel 42 contacts a transport roller 13a. The arrangement of the clutch 47 is such that the wheel 42 can be held stationary by the transport or sensor roller 13a while the wheel 41 and the shaft 43 can continue to rotate under the driving force of the propelling member 17.

The pivot post 45 is supported by the bearing block 51. Below the bearing block a terminal block 53 is secured to the bottom of the post. This arrangement is made necessary because the pivot post 45 is urged upwardly by a spring 54 surrounding the post between the top of the bearing block 51 and the bearing 55 between the upper end of the spring and the yoke 50. The bearing block 51 is bolted to the bottom surface of the support member 57 which in turn is supported by the rails 14. The bearing block has a boss 52 to support the shaft of the post.

The wheel 41 in contact with the belt 17 is approximately ten percent larger than the wheel 42 contacting the transport roller 13a. Both wheels 41 and 42 are preferably provided with a tire of a suitable synthetic material to provide the necessary frictional contact between the wheels and the roller or belt.

The terminal block 53 secured to the bottom end of the pivot post mounts one end of an actuator rod 60. The actuator rod extends upstream of the conveyor from the sensor to a position upstream of the terminal one 16a of the support rollers 16 of the next upstream zone (FIG. 1 and 4). The end of the actuator rod being adjacent the support roller 16a is seated in one of the pockets 61 in the downstream face of the adjacent bearing block. Adjacent the bearing block in which the end of the rod 60 is supported, the rod has a pair of laterally spaced upstanding fingers 62 which bracket the auxiliary belt 18 immediately above it.

OPERATION

Assuming that the accumulator is in transport mode, the forces acting on all of the sensor assemblies 40 will pivot them in a direction to cause the actuator rods 60 to urge the auxiliary belts 18 onto the outer portions of the support rollers 16. This maintains the propelling member 17 in transport position. This will occur because both wheels 41 and 42 will be driven by surfaces having identical or substantially identical surface speeds, those being the surfaces of the propelling member 17 and the adjacent transport roller 13. However, since the wheel 41 is larger than the wheel 42, it will rotate more slowly than the wheel 42 and thus will impose through the clutch 47 a small drag on the wheel 42. This will cause the wheel 41 to migrate upstream of the movement of the propelling member. As it does so it will pivot the sensor about the pivot post 45 and, in so doing, pivot the actuator arm 60 into a position to urge the auxiliary belt 18 onto the outer or larger diameter portions 32 of the support rollers of the group with which it is associated. Although the articles being transported, even when in movement, may cause a slight reduction in peripheral speed of the roller 13a, this will not result in a shift of the sensor assembly because of the speed differential resulting from the differential in wheel diameters. When the movement of articles along the conveyor is maintained at a substantially uniform speed and is free of obstruction, this situation will continue.

When the forward motion of the articles is impeded such as to either slow it or halt it altogether, this will cause the peripheral speed of the transport roller to either be reduced or halted. In either case the rotation rate of the wheel 42 will be materially changed. The drag on the sensor assembly resulting from this will cause the wheel 41 to shift downstream of the belt because it continues to be driven by the belt. This pivots the rod 60 to the opposite side of the pocket 61. In doing so, the fingers 62 urge the auxiliary belt 18 off the outer portions 32 of the support rollers and onto the inner portions 31. The migration of the auxiliary belt 18 removes the support from beneath the propelling member 17 in the affected zone, causing it to disengage the transport rollers above it. Thus, the accumulator in that zone is shifted to accumulation mode. This situation will continue until the obstruction to article movement is terminated.

However, it will be observed that the sensor 40 in the affected zone does not change its vertical position since its vertical position is the result of the resilient bias of the spring 54. Thus, contact between the sensor 40 and both the propelling member 17 and the sensor roller 13a remains constant. This bias, however, is not enough to lift the sensor roller 13a when no article is resting on it. The sensor 40 will not pivot because the roller 13a will continue to rotate under the drive of the propelling member 17 until an article in contact with it forces it to either slow or stop. Only then will the sensor react. This eliminates sequential shifting to accmulation mode. Any other arrangement would trigger a cascading effect of shift to accumulation mode upstream of the sensor even though there was no reason for such a shift. This effect would occur even though the entire upstream portion of the accumulator was vacant. The pressure exerted by the spring 54 is such that the sensor roller 13a is easily held stationary by even a small stationary article resting on it, even though contact between it and the propelling member is maintained.

Article movement will be reinitiated in the downstream zone when its auxiliary belt 18 has been caused by any suitable means to shift to drive position. When this occurs, the sensor assembly in that zone will be caused to shift to drive position because the wheel 42 will accelerate until it again exceeds that of the wheel 41. This restores transport in the zone affected by the sensor assembly by causing the auxiliary belt to once again travel up the ramps onto the outer portions of the support rollers.

Figure 6:
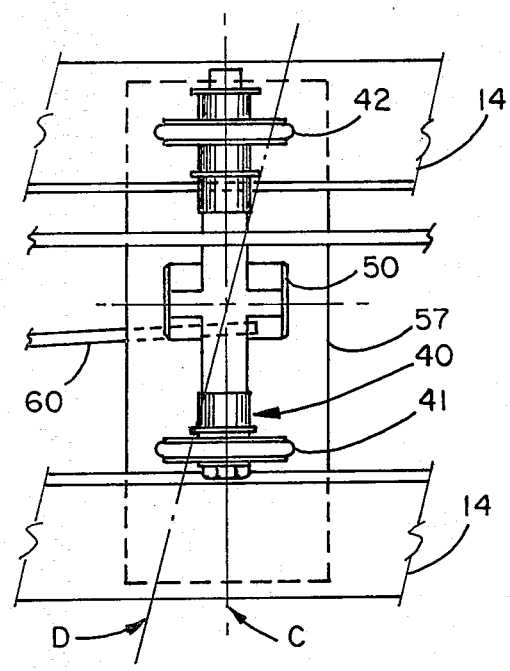
FIG. 6 is a somewhat schematic plan view of one of the sensors illustrating its change in position in response to article movement.

The end of the rod 60 being trapped in one of the pockets 61 limits the pivotal movement of the sensor. Preferably the sensor is held in substantial alignment with the transport rollers (line C, FIG. 6) when the accumulator is in transport mode. The sensor shifts to a small angular position (line D, FIG. 6) when in accumulation mode. The actual arc of movement is small and engagement between the sensor and the transport roller is maintained at all times.

The force necessary to cause the auxiliary belt to initiate its movement from one portion of the support roller to another is small because all the sensor has to do is to apply a very small lateral force against the belt to initiate lateral movement. The rotation of the support rollers 16 and the effect of the ramps 33 provide both the guidance and most of the energy necessary to cause the belt to make the transition in either direction.

As will be noted from FIGS. 7 and 7A the support rollers 16 are symmetrical about their midpoint but, in any one zone, mount an auxiliary belt 18 only on one side. It will be noted from FIG. 1 that the auxiliary belts in adjacent zones are installed on opposite sides at the centerline of the support rollers. By do doing, the propelling member 17 is alternately supported on opposite sides. This assures accurate tracking of the propelling member. Thus, the need of double belts and the problems that such would create in the necessity to synchronize their movement is eliminated.

It will be seen from the preceding description that this particular arrangement practically eliminates the sensitivity of the conveyor to weight differential between articles so far as their functionality in actuating the sensor. Also, the system is such that articles in normal transport mode do not generate a mode shift signal since the sensors remain in their original positions. Inasmuch as the sensors are responsive only to motion rather than to pressure, the cancellation and reestablishment of transportation mode becomes non-sequential because transportation will be initiated not when the occupancy of a sensor is vacated but rather that motion of the article resting on the sensor contacting roller is reestablished. Thus, the reaction lag resulting from the time necessary for an article to vacate the sensor is eliminated. This has the benefit of eliminating all or almost all of the spacing between the articles as they reestablish forward motion. This greatly increases the overall capacity of the conveyor. An accumulator incorporating this sensor has a throughput rate which is almost one hundred percent of the belt speed. The arrangement also permits articles to be pushed backward on the conveyor without significant resistance should the need occur. The construction is such that there is no interference with the freedom of the transport rollers to pop out. This is important from a safety point of view. Another important improvement of the invention is a material reduction in noise level because there is no sensor or actuator reaction to articles in normal transport. When mode shift does occur the movement of the sensor and the accompanying movement of the rod to shift the auxiliary belt 18 is practically noiseless. This is a significant improvement over previously known sensor constructions.

Figure 8:
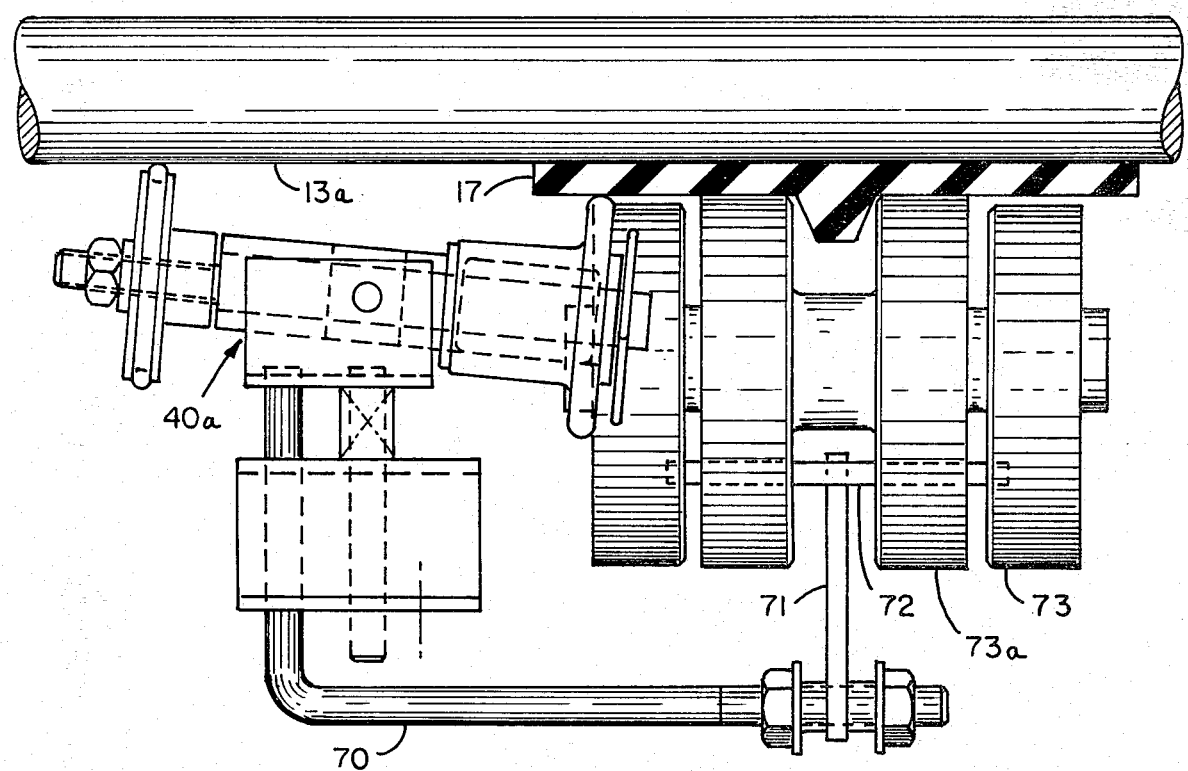
FIG. 8 is a fragmentary sectional view of a modified construction for this invention.
Figure 9:
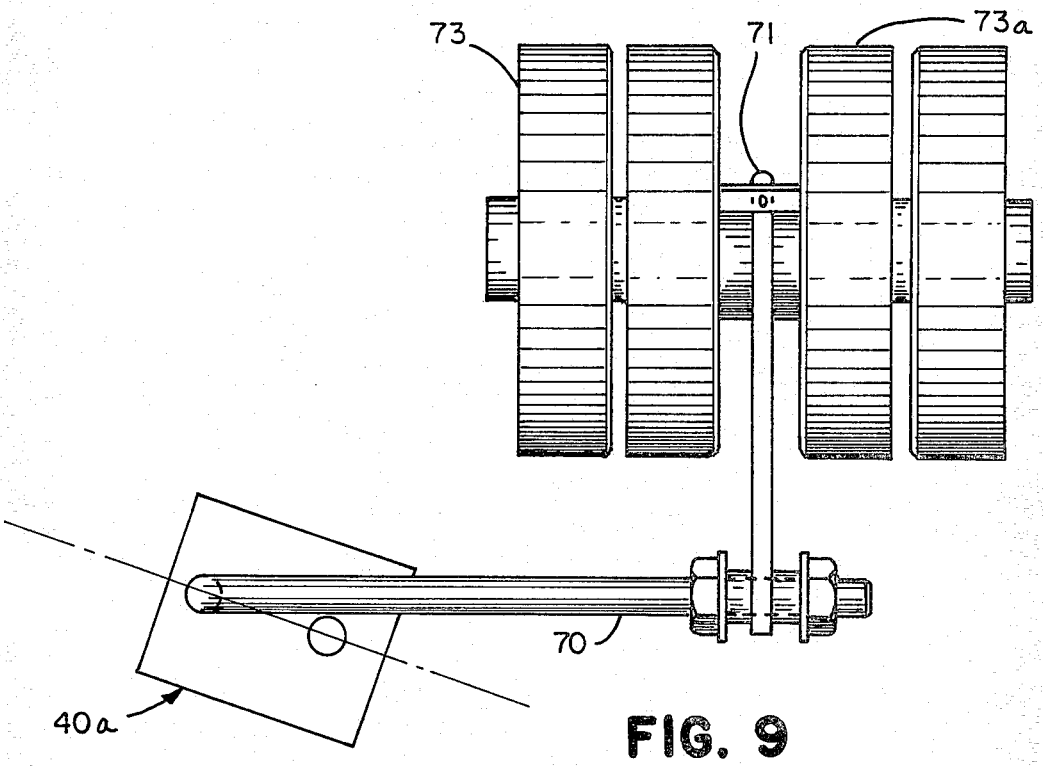
FIG. 9 is a fragmentary bottom view of the modified construction illustrated in FIG. 8.

The invention can be used without the satellite or auxiliary belt as a means of shifting conveyors equipped with the eccentric type of propelling member support to effect engagement and disengagement of the propelling member by stopping rotation of the support rollers with their flattened segments engaging the belt. This type of support roller and its method of raising and lowering the belt is disclosed in U.S. Pat. No. 3,854,576, entitled "Eccentric Wheel Accumulators", issued Dec. 17, 1974, to Clyde L. Bowman. In this case the pivotal motion of the sensor 40a can be transmitted by the arm 70 to a stop 71 for engaging a bar 72 which, when checked at the proper point as taught in the above described patent will bring both roller pairs 73 and 73a into alignment with their flattened portions in a raised position where the belt can drop away from the transport rollers (FIGS. 8 and 9). The same principles and construction of the wheels of the sensor 40a apply as in the case of the sensor 40. The only difference is in the manner in which the pivotal movement of the sensor is translated into control of the vertical position of the belt. This particular arrangement will have a higher noise level than the satellite or auxiliary belt arrangement but it does have utility in other circumstances where the added noise is not a significant factor.

Having described a preferred embodiment of this invention and a modified application of it, it will be recognized that other modifications of the invention may be made without departing from the principles of the invention. Such modifications are to be considered as included in the hereinafter appended claims unless these claims, by their language expressly state otherwise.

The embodiments of the invention in which an exclusive property or privilege is claimed are defined as follows:

1. A sensor for controlling mode shift between transport and accumulation of an accumulator conveyor having an article conveying surface comprised of transport rollers and a propelling member and means supporting said propelling member from beneath for vertical movement between transport roller engaged and disengaged positions; said sensor having a shaft; a pair of wheels laterally spaced with respect to said conveying surface and mounted at the opposite ends of said shaft; one of said wheels being in driven engagement with and driven by said propelling member and the other in engagement with and driven by one of said transport rollers; said shaft intermediate its ends being mounted for pivotal movement about a vertical axis in response to differentiation in angular velocity between said wheels; a one-way clutch between said shaft and said other wheel to permit said other wheel to remain stationary while said one wheel continues to rotate, means connecting said sensor to said support means for transmitting pivotal movement of said sensor to said support means.

2. A sensor as described in claim 1 wherein said one wheel is larger than said other wheel whereby when said propelling member and roller have the same surface speed, said one wheel will have a lower angular velocity than said other wheel.

3. A sensor as described in claim 1 wherein resilient means are provided to bias said wheels into contact with said propelling member and transport roller.

4. A sensor as described in claim 2 wherein the differential in size between the wheels is approximately ten percent.

5. A sensor for controlling mode shift between transport and accumulation of an accumulater conveyor having a propelling member and an article conveying surface comprised of transport rollers; said sensor having a shaft; a pair of wheels laterally spaced with respect to said conveying surface and mounted at the opposite ends of said shaft; one of said wheels being in driving engagement with said propelling member and the other with one of said transport rollers; means mounting said shaft intermediate its ends for pivotal movement about a vertical axis in response to differentiation in speed between said wheels; a one-way clutch between said shaft and said other wheel to permit said other wheel to remain stationary while said one wheel continues to rotate; means connected to said sensor for shifting said accumulator between accumulation and transport modes in response to pivotal movement of said sensor about its vertical axis.

6. A sensor as described in claim 5 wherein said one wheel is larger than said other wheel whereby when said propelling member and roller have the same surface speed, said one wheel will have a lower angular velocity than said other wheel.

7. A sensor as described in claim 6 wherein said one wheel is secured to said shaft whereby said shaft is made to rotate with said wheel.

8. A sensor as described in claim 6 wherein said shaft mounting means includes a yoke and a vertical post; a bearing block rotatably mounting said post; a spring surrounding said post and urging said sensor into engagement with said propelling member and transport roller.

9. In an accumulator conveyor having article transport rollers and a driven, endless propelling member, a plurality of means supporting said propelling member, said means being arranged in groups positioned in tandem along said conveyor, said means being movable between a conveying position and an accumulation position, a sensor for each of said groups responsive to article movement on said conveyor, said sensor characterized in having a shaft extending generally laterally of said conveyor, a first wheel mounted on one end thereof, a second wheel mounted on the other end thereof and a one-way clutch interconnecting said wheels, said first wheel being smaller than said second wheel, first means supporting said shaft intermediate its ends for pivotal movement about both a vertical axis and a horizontal axis, said first wheel being rotated by motion received from one of said article transport rollers, said second wheel being in driven contact with said propelling member, angular velocity differential of said wheels biasing said shaft a position substantially normal to the axis of said conveyor when articles in contact with said transport roller are in motion, said shaft being pivoted about its vertical axis when the angular velocity differential increases due to decreased forward motion of articles contacting said transport roller, said sensor when so pivoted shifting its group of support means to accumulation position.

10. A sensor as described in claim 1 wherein resilient means is provided for urging said wheels of said sensor into constant engagement with both said propelling member and said one transport roller.

11. A sensor as described in claim 10 wherein said resilient means through said one wheel maintains constant contact between said propelling member and said one transport roller during both transport and accumulation modes of the accumulator.

* * * * *